United States Patent [19]

Morton et al.

[11] 4,129,492
[45] Dec. 12, 1978

[54] ELECTROLYTIC CELL

[75] Inventors: Peter H. Morton, Solihull; John R. B. Gilbert, Sutton Coldfield; John P. A. Wortley, Harborne, all of England

[73] Assignee: Imperial Metal Industries (Kynoch) Limited, Birmingham, England

[21] Appl. No.: 752,857

[22] Filed: Dec. 21, 1976

[30] Foreign Application Priority Data

Dec. 23, 1975 [GB] United Kingdom ............... 52593/75

[51] Int. Cl.² .................. C25D 1/04; C25D 3/38; C25D 17/00
[52] U.S. Cl. ..................... 204/212; 204/13; 204/28; 204/44; 204/48; 204/252
[58] Field of Search ............ 204/212, 180 R, 213, 204/106, 12, 13, 252, 52 R, 43 R, 112, 27, 28, 44, 48

[56] References Cited

U.S. PATENT DOCUMENTS

| 1,536,569 | 5/1925 | Cruse ...................... 204/212 |
| 1,567,737 | 12/1925 | Jullien ..................... 204/212 |
| 1,682,426 | 8/1928 | Schutte .................... 204/212 |
| 2,587,630 | 3/1952 | Konrad et al. ........... 204/252 X |
| 2,884,571 | 4/1959 | Hannahs ................. 204/12 X |
| 3,461,046 | 8/1969 | Clancy ..................... 204/13 |
| 3,674,656 | 7/1972 | Yates ....................... 204/13 |
| 3,799,847 | 3/1974 | Vladimirovna et al. ... 204/13 |
| 3,829,366 | 8/1974 | Ives et al. ................ 204/12 X |

Primary Examiner—Arthur C. Prescott
Attorney, Agent, or Firm—Cushman, Darby & Cushman

[57] ABSTRACT

An electrolytic cell, particularly one for use in the production of foil, in which the cathode comprises a rotating drum having a conforming anode spaced therefrom with a melded fibre interlayer. The interlayer remains stationary while the drum rotates over the fibrous surface, thereby breaking up the depleted barrier layer adjacent the cathode, avoiding arcing and reducing the tendency for the cathode deposit to grow in a modular manner.

15 Claims, 3 Drawing Figures

ELECTROLYTIC CELL

BACKGROUND OF THE INVENTION

This invention relates to electrolytic cells and has particular reference to electrolytic cells in which the cathode is caused to move.

The production of metal foil such as copper foil by the electrodeposition of copper onto a rotating cathode drum is well-known in the art. Because the drum is only slowly rotating (in order that a sufficiently thick layer of metal may be deposited on it to form a sufficiently thick foil), it is difficult to avoid depletion of the ions being deposited on the drum in the zone immediately adjacent the surface of the drum. It is also important that the anode/cathode spacing be as small as possible to reduce resistance losses in the electrolytic cell.

The prior art methods have always utilised inert anodes in an operation which is effectively an electrowinning operation. It has not been possible to use a consumable or semi-consumable anode as changes in the shape of normal conventional solid consumable or semi-consumable anodes would result in variations in the anode/cathode gap which would adversely affect both the quality of the foil being deposited and the efficiency of the operation. Prior art foil-making has always supplied the ions for the electrodeposition step in the form of a solution of the ions normally in water. By contrast, however, the present invention makes possible the use of consumable or slowly consumable anode materials and this has the advantage of a lower cell voltage with a consequent economy in power consumption and also because the gap is a regular gap between the anode and the cathode, high quality deposit is formed.

There has been a proposal to use a rapidly moving belt of a nonconductive mesh in the electrodeposition of foil. This mesh includes hard particles which are said to activate the electrodeposit. Details of this proposal will be found in U.S. Pat. No. 3619400. The mesh is, however, rapidly moving and needs to be moved rapidly to entrain ions of the material being deposited into the small gap between the inert anode and the cathode drum.

Another proposal has been made to use a rotating drum (although in this case not for the production of foil) in which a conforming anode which is permanent has on its surface a fibrous mesh which again incorporates hard activating particles. Details of this proposal are to be found in British Pat. Specification No. 1257541 and in particular with reference to FIG. 5 of that specification. An essential feature of both of these prior art suggestions is the incorporation of the hard particles in the mesh. It was considered that the hard particles activated the surface of the electrodeposit through the generation of new dissolution sites through mechanically distorting the crystal lattice of the metal deposited. Sufficient pressure had to be applied to the matrix to achieve the object. The moving belts described in the British Patent Specification (not relating directly to FIG. 5) had a surface speed of 1000 feet per minute (approximately 300 meters per minute) across the surface of the cathode. It is presumed that this speed was necessary to cause sufficient distortion of the electrodeposit to produce the required activation.

In all cases, the prior art constructions used non-consumable anodes which were spaced from the cathode by a very small distance. Other examples of the use of the abrasive belts and pads will be found in U.S. Pat. Nos. 3619401, 3619389, 3619383 and 3619384.

SUMMARY OF THE INVENTION

By the present invention, there is provided an electrolytic cell including a cylindrical cathode rotatable about its longitudinal axis and an anode of particulate consumable or slowly consumable material spaced from the cathode by a stereo-reticular array of electrically insulating material, the stereo-reticular array being fixed in position relative to the anode and the cathode being rotatable so that its surface is in contact with the surface of the stereo-reticular array.

Preferably, the longitudinal axis of the cylindrical cathode is maintained in a horizontal plane. The cathode may be formed of stainless steel, titanium or other film-forming metal. The electrodeposit may be continuously stripped off the cathode drum in the form of a foil.

The electrolyte in the cell may include copper ions to form a copper-containing foil, or may include iron ions to form an ironcontaining foil. In the case of copper ions, the electrolyte may be an acidic copper sulphate aqueous solution. In the case or iron ions, the electrolyte may be an acidic ferrous chloride solution.

The stereo-reticular array may be a melded fibre structure (as herein defined) of plastics materials fibre. The plastics material may be polyvinyl chloride or polyethylene or polypropylene, or acidresistant polyester.

Alternatively, the stereo-recticular structure may be a non-woven open skeletal structure of many resilient springy fibrous members. Such a structure may be produced by a Rando-Webber machine in known manner.

The consumable anode may be formed of scrap material to be electrorefined, the scrap material being in particulate form and being continuously topped up during operation. The slowly consumable anode material may be an intermetallic compound, such as a compound of titanium and the metal being deposited on the cathode drum. In particular, the compound may be a compound of titanium and copper or titanium and iron. One or more of the metals chosen from the Atomic Nos 23–29 may be incorporated in the slowly consumable anode material so that the anode material does not passivate under the conditions obtaining during electrolysis. Preferably, the dissolution rate of the slowly consumable material is less than half the faradaic dissolution rate under the conditions obtaining in the electrolytic cell.

The current may be connected into the particulate anode by means of a feeder bar such as copper-cored titanium feeder bar.

The stereo-reticular array may be in the form of a sheet which is tensioned against the surface of the cathode drum to space the particulate anode material from the surface.

By "film-forming metal" as used herein is meant a metal chosen from the group titanium, zirconium, hafnium, niobium or tantalum or an alloy based thereon having similar passivation properties to the pure metals.

By a "melded structure" is meant a non-woven web of fibres formed from bi-component fibres. The bi-component fibres comprise a central core and an exterior sheath having a lower softening temperature than the core. The fibres are non-wovenly formed into the web and heated to a temperature at which the outer component softens and the outer components join together where they touch. The inner component retains it rigidity at the softening point of the outer component so that the web-like structure is not lost.

By a "stereo-reticular array" as has been used herein is meant a three-dimensional body containing large numbers of interlinked cells or voids and would include, for example, an open-celled foam in which the pores of the foam were interconnected.

BRIEF DESCRIPTION OF THE DRAWINGS

By way of example, embodiments of the present invention will now be described with reference to the accompanying drawings, of which.

DESCRIPTION OF THE PREFERRED EMBODIMENTS

Figure 1:
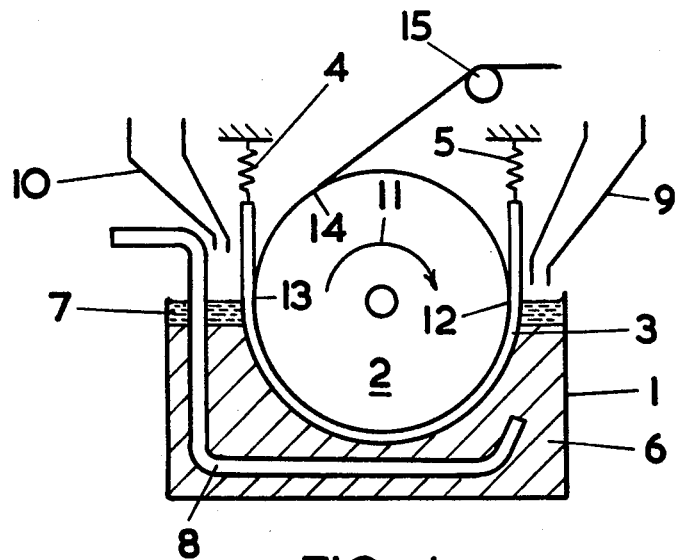
FIG. 1 is a schematic cross-section of a cell containing a rotatable cathode.

Referring to FIG. 1, the electrolytic cell comprises an outer casing 1 in which is located a rotatable cathode drum 2 formed of titanium. Surrounding about half of the periphery of the drum is a melded fibre belt 3 which is held against the surface of the drum 2 by means of springs 4 and 5. Within the casing 1 is poured a mass of copper scrap 6 which has been chopped to enable it to be poured. The casing is then filled with acidic copper sulphate to completely cover the particulate copper scrap such as at 7. A copper-cored titanium rod 8 is located within the copper scrap to act as a current feed-in and to form the copper scrap 6 into an anode when the electrical connections to the cell are made. Chutes 9 and 10 permit copper scrap to be added into the electrolytic cell to top up the copper 6 as it is consumed. The drum 2 may be connected to a negative pole to act as a cathode by any suitable electrical brush connection (not shown). When the cell is in operation, the cathode is rotated in the direction of the arrow 11 and the cathode and anode are connected to a suitable source of electrical supply. The copper is then dissolved from the anode mass 6 and ions pass through the melded belt 3 to be deposited onto the surface of the cathode drum 2. By the time the surface, initially at point 12 on the drum, has rotated to point 13, a foil of copper has been deposited onto the surface which is stripped off at 14, passes over roller 15 to a suitable coiling drum (not shown). The fibrous belt 3 serves to keep the space between the anode and cathode small but because it is highly porous, does not significantly interfere with the movement of ions from the anode to the cathode. The movement of the surface of the cathode drum over the fibrous belt breaks down the depleted barrier layer which normally exists near a cathode and causes sufficient local turbulence to enhance the deposition of copper onto the moving drum.

Figure 2:
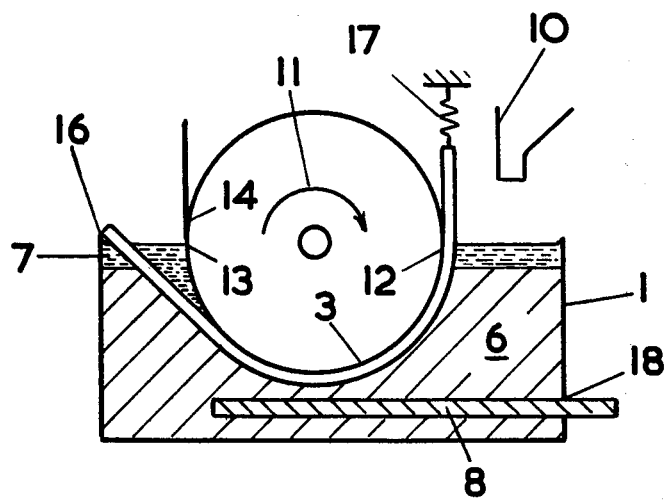
FIG. 2 is a schematic cross-section of an alternative form of cell.
Figure 3:
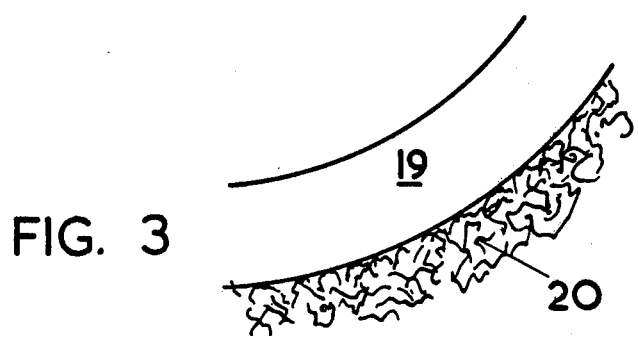
FIG. 3 is an enlarged view of the surface of the cathode with adjacent fibres of a melded belt.

In the embodiment illustrated in FIG. 2, like reference numerals refer to like members as in FIG. 1. It can be seen, however, that the belt 3 is rigidly connected at one end 16 to the casing 1 and is only tensioned by means of a single spring 17. The current lead-in for the anode is fed in through the side of the casing 1 by means of a suitable seal at 18. Referring to FIG. 3, it can be seen that the surface of the electrodeposit 19 is connected by a large number of fibres 20 which scrape along the surface to break up the depleted barrier layer adjacent the surface.

Apart from fully consumable copper, other fully consumable metals such as iron or iron alloys, nickel, tin, gold etc may be used as the anode mass 6. As an alternative, slowly consumable anodes may be used which would include, for example, intermetallic compounds of copper and titanium, iron and titanium, or other suitable materials. The drum may be more fully immersed in the electrolyte if required.

We claim:

1. An electrolytic cell for the production of sheet metal comprising a container for electrolyte, a cylindrical cathode rotatable about its longitudinal axis having part at least of its surface immersed within the electrolyte, an anode of particulate consumable or slowly consumable metallic material, a stereo-reticular array of electrically insulating material in contact with the cathode and anode and spacing the anode from the cathode, the stereo-reticular array being fixed in position relative to the anode and to the container, the cathode being rotatable with its surface in contact with the stereo-reticular array so that the surface of the cathode wipes the stereo-reticular array.

2. A cell as in claim 1 in which the longitudinal axis of the cylindrical cathode is in a horizontal plane.

3. A cell as in claim 1 in which the cathode is formed of a material chosen from the group consisting of stainless steel, titanium, or other film-forming metal.

4. A cell as in claim 1 including means for continuously stripping electrodeposit off the cathode in the form of a foil.

5. A cell as in claim 1 in which the container contains an electrolyte containing ions selected from the group consisting of copper ions and iron ions whereby a foil of copper or iron, respectively, is formed on the cathode.

6. A cell as in claim 5 in which the electrolyte is selected from the group consisting of acidic copper sulphate solution and acidic ferrous chloride solution.

7. A cell as in claim 1 in which the stereo-reticular array is formed of a melded fibre structure of plastics material fibre.

8. A cell as in claim 7 in which the plastics material is selected from the group consisting of polyvinyl chloride, polyethylene, polypropylene, or acid resistant polyester.

9. A cell as in claim 1 in which the stereo-reticular array is a non-woven open skeletal structure of many resilient springy fibrous members.

10. A cell as in claim 1 in which the consumable anode is formed of particulate scrap material to be electrorefined, and means for continuously replenishing the scrap material during operation of the cell.

11. A cell as in claim 1 in which the slowly consumable anode material is an intermetallic compound.

12. A cell as in claim 11 in which the intermetallic compound is a compound of titanium.

13. A cell as in claim 1 including a feeder bar for feeding current into the particulate anode.

14. A cell as in claim 13 in which the feeder bar is a copper cored titanium bar.

15. A cell as in claim 1 in which the stereo-reticular array is in the form of a sheet which is tensioned against the surface of the cathode drum to space the particulate anode material from the surface.

* * * * *